United States Patent
Verma

(10) Patent No.: US 7,141,175 B2
(45) Date of Patent: Nov. 28, 2006

(54) OXIDATION REDUCTION POTENTIAL (ORP) BASED WASTEWATER TREATMENT PROCESS

(76) Inventor: Kuldeep C. Verma, 31628 Glendale Ave., Livonia, MI (US) 48150

(*) Notice: Subject to any disclaimer, the term of this patent is extended or adjusted under 35 U.S.C. 154(b) by 104 days.

(21) Appl. No.: 10/421,916

(22) Filed: Apr. 24, 2003

(65) Prior Publication Data

US 2003/0234219 A1    Dec. 25, 2003

Related U.S. Application Data

(60) Provisional application No. 60/375,525, filed on Apr. 25, 2002.

(51) Int. Cl.
*C02F 3/00*    (2006.01)

(52) U.S. Cl. .................. 210/739; 210/746; 210/749; 210/758; 210/220

(58) Field of Classification Search ............... 210/739, 210/746, 749, 758, 220
See application file for complete search history.

(56) References Cited

U.S. PATENT DOCUMENTS

| | | | | |
|---|---|---|---|---|
| 4,006,346 A | * | 2/1977 | Pemberton | 700/39 |
| 4,192,708 A | * | 3/1980 | Bergstrom et al. | 162/49 |
| 5,598,770 A | * | 2/1997 | Campbell et al. | 99/487 |
| 6,598,617 B1 | * | 7/2003 | Spicer | 137/391 |
| 6,620,315 B1 | * | 9/2003 | Martin | 210/96.1 |

* cited by examiner

*Primary Examiner*—Chester T. Barry
(74) *Attorney, Agent, or Firm*—Carrier, Blackman & Associates, P.C.; William D. Blackman; Joseph P. Carrier

(57) ABSTRACT

A method of treating wastewater is described in which an oxidation reduction potential (ORP) of a wastewater stream over time at a plurality of processing stages using a plurality of ORP sensors is used. The wastewater is modified based on the sensed ORP so as to raise the ORP when the sensed ORP is below a target ORP range.

19 Claims, 2 Drawing Sheets

OXIDATION REDUCTION POTENTIAL (ORP) BASED WASTEWATER TREATMENT PROCESS

CROSS-REFERENCE TO RELATED APPLICATIONS

This application claims benefit of Provisional Patent Application 60/375,525 filed Apr. 25, 2002, USPTO Confirmation number 1606.

FIELD OF INVENTION

The present invention relates to a process for treatment of wastewater mainly by raising or optimizing the oxidation reduction potential of water followed by need based chemical treatment guided by knowledge of chemistry of said chemical at said oxidation reduction potential.

BACKGROUND OF THE INVENTION

Currently, wastewater treatment or processing decisions are based on pH, dissolved oxygen and biological oxygen demand of the water. These are narrow ranged indices and do not present information about complete biological status of water. There is no set protocol governing the addition of chemicals to wastewater. The management as well as operators use this information and decide the processing steps based on their 'gut feeling' or experience. As a result, many a times the addition a chemical to correct one problem creates another problem(s). As noted by the inventor at Detroit Wastewater Treatment Plant, often this practice leads to catastrophic results with serious legal violations and technical problems costing millions of dollars.

The inventor is proposing a logical alternative where all and any wastewater processing decisions are to be taken based on the real-time oxidation-reduction potential (ORP) status of water. ORP is a broad ranged index and indicates direct and complete biological status of water. Technical reasoning and experimental data has been presented to prove that whatever had been done was wrong and that serious money can be saved if rules of ORP are followed. Various changes in practices and mechanical designs have been suggested. A computer-software is suggested to be prepared which can provide a better control on the use of resources based on real time status of ORP.

An entirely new approach to optimize or raise the ORP value of water by various means before as well as after its entry into wastewater treatment facility has been suggested. This patent teaches a logical concept which can aid in better wastewater processing at significantly low cost.

Most of the existing wastewater facilities are designed to collect all the influents in a preliminary treatment area, where large debris and solids are screened out of the wastewater. The remaining water is allowed to pass through a primary treatment area where it is subjected to chemical treatments (for example, addition of ferrous chloride for phosphate removal and some polymers to facilitate floc formation). The water is then mixed with a bacterial biomass, and passes through an aeration phase. The movement of water is then slowed down in large tanks called secondary clarifiers, to allow settling of sludge, and the decanted water is subsequently disinfected by various means.

Wastewater treatment decisions currently are mainly based on parameters like pH, Dissolved Oxygen (DO), Biological Oxygen Demand (BOD) etc which are, in fact, contributing partners to a single and superior parameter called Oxidation-Reduction Potential (ORP), which has not been understood and exploited properly. Moreover, the former parameters have a narrow range and do not clearly reveal the precise biological status of the water.

SUMMARY OF THE INVENTION

This is the first attempt to highlight commercial importance of Oxidation-Reduction Potential (ORP). So far ORP has been measured as a routine and decisions have been made based on operators' past experience and 'gut feeling' without involving any scientific logic. ORP can be logically incorporated into processing decisions thereby sensibly saving money. This patent teaches that the wastewater processing decisions, especially the chemical additions and oxygenation, be based on observation and interpretation of ORP values on a daily basis. More specifically, this invention relates to a process where wastewater treatment or processing decisions, like what, when, where and how much of chemicals, oxygen, air or other ingredients are to be added, are made after assessing oxidation-reduction potential status of water at the point of use. its understanding not only provides an important guide for managing any biological system (including the human body), but also can be used as a resource management tool for processes like wastewater treatment, where it can bring about significant procedural improvements with real cost savings.

A computer-software program can also be prepared, according to the present invention, to manage the input of wastewater resources based on real time status of ORP.

BRIEF SUMMARY OF THE INVENTION

Oxidation-Reduction Potential (ORP) is a broad ranged parameter mostly varying between −800 mV to +800 mV and represents the final outcome of complex interactions between microbes, food, oxygen, sunlight and temperature etc., at a given point of time. It is a better indicator of real time biological status of wastewater (or any other biological system) as compared to pH or DO, upon which the water processing decisions at most of wastewater treatment plants are currently based.

The purpose of this patent is to highlight the commercial importance of ORP and its use in decisions for cost efficient processing of wastewater. A computer software program is also proposed, according to the present invention, to manage the resources in the wastewater treatment plant, mainly based on in-line ORP measurements at various points. It is also proposed to precondition the influents by mixing the unprocessed wastewater with high ORP water, such as water from a spring, fountain or mountainous stream, followed by a well-calculated addition of chemical to achieve the desired objective. This could conceivably lead to serious cost savings.

DETAILED DESCRIPTION OF THE INVENTION

Figure 1:
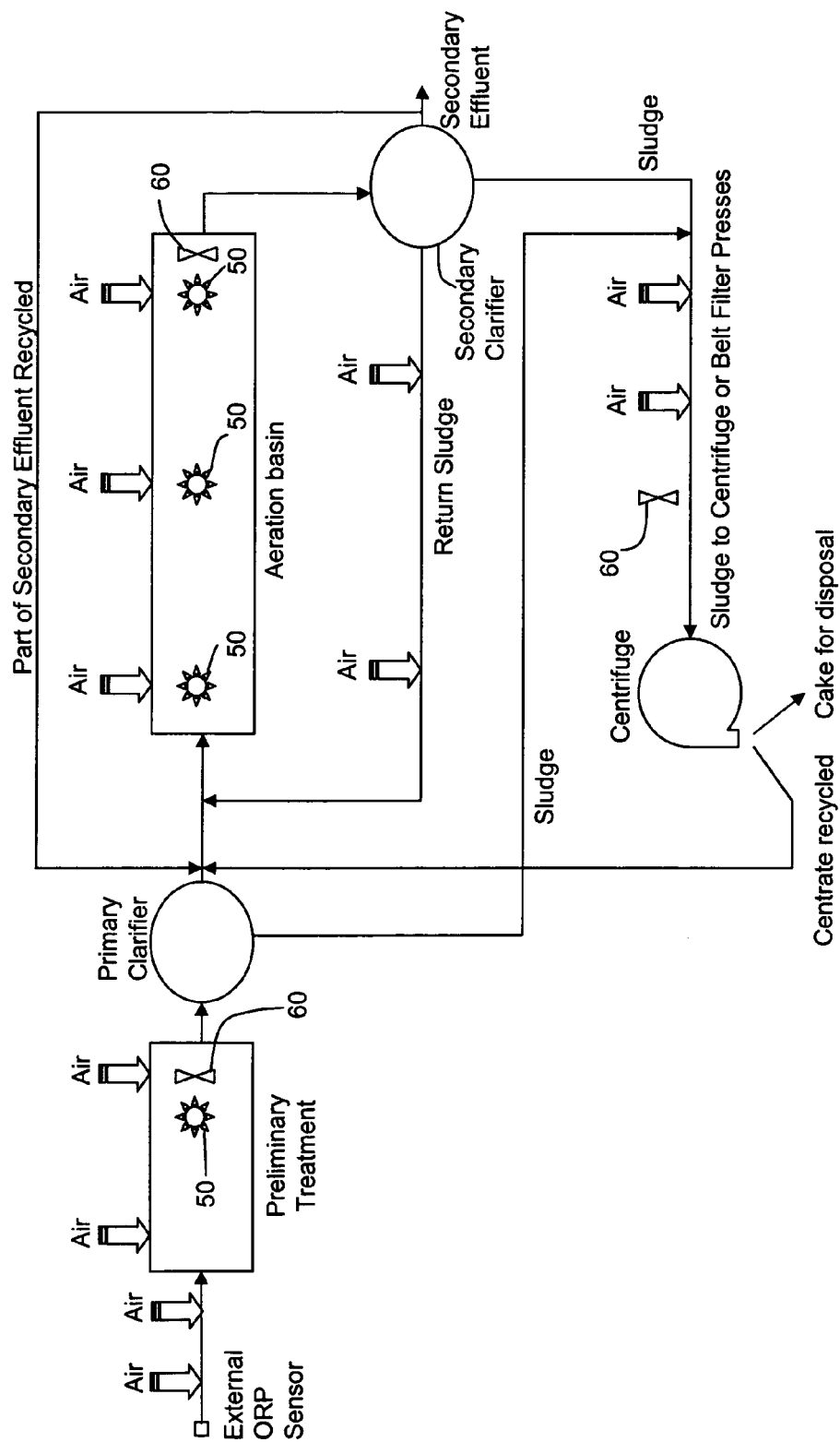
FIG. 1 is a schematic overview of a wastewater treatment facility operating with ORP based management of wastewater treatment.
Figure 2:
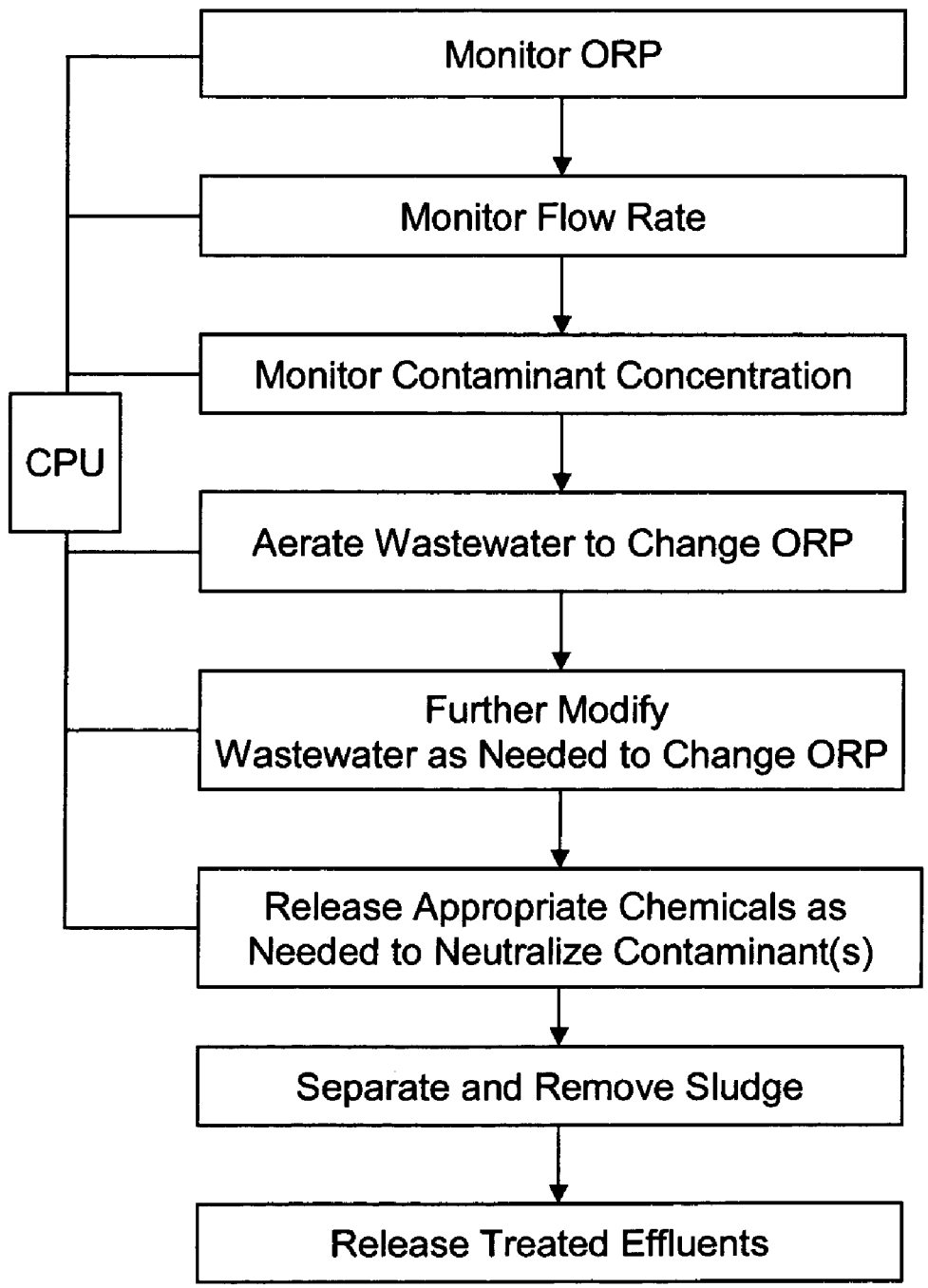
FIG. 2 is a flowchart showing steps involved in a wastewater treatment method according to the present invention.

Specifically, Oxidation-Reduction Potential (ORP) is a measure of accumulation or deficiency of charged molecules, particularly electrons, in the biological system. In simple words, it is a measure of electron pressure (or concentration) in a solution or system. During microbial metabolism, electrons are produced, which must preferably be removed by oxygen to produce energy by a process called oxidative-phosphorylation. In an absence of oxygen, these electrons accumulate or react with other ions to impart a negative charge, resulting in a negative ORP, measured in millivolts (mV). Thus, a negative ORP is a clear indication that the system is anaerobic, and needs oxygen on a priority basis rather than any other chemical. FIG. 1 shows a schematic overview of a wastewater treatment facility operating with ORP based management of wastewater treatment, in which numeral 50 represents an ORP based $FeCl_3$ release mechanism including online flow meter, phosphate analyzer, ORP measuring probe, $FeCl_3$ releasing mechanism, and related computer software/hardware, linked to a central data control room; and numeral 60 represents ORP based cationic chemical or polymer release mechanism including online flow meter, ORP measuring probe and polymer release mechanism and related computer software/hardware, linked to a central data control room. FIG. 2 illustrates steps in an illustrative wastewater treatment method according to an embodiment of the present invention.

Every molecule, has a specific ORP equilibrium constant ($pK_{ORP}$, a new term designed by us), around which it exists in different forms in differing proportions. For example, iron is 50% ferrous and 50% ferric at an ORP of approximately +120 mV (i.e. the $pK_{ORP}$ iron is +120 mV). Above +120 mV, fete ion is in dominating proportion.

The effectiveness of a molecule, therefore, will much depend upon ORP status of the solution to which it is being added. In other words, if ORP is not appropriate, the treatment may not only be ineffective, but may cause adverse effects. Similarly, the use of an anionic polymer at the negative ORP to obtain polymerization, would be ineffective.

In addition to the information provided above and based on the laboratory observations laid out in tables below, the ORP values change with time and weather conditions of the day. Influents to a wastewater facility are usually in the negative range in summer and sunny days presumably due to relatively high metabolic activity as compared to amount of oxygenation of influents. ORP of influent sewage is generally positive during winter months, cold as well as wet weather and few days thereafter, presumably be due to lesser metabolic activity during winter months and/or significantly higher oxygenation of water due to rain, fog or snowfall.

Addition of any negatively charged chemical or any chemical capable of releasing electron at a negative ORP would be ineffective till the ORP rises to a desired level. For example, an ORP of +120 mV is necessary to assure maximum benefit of any iron salt to be added with an aim of reducing phosphate concentration in wastewater.

These facts can be better interpreted if explained with an example from Detroit Wastewater Treatment Plant (DWWTP).

During the period between January–June 2000, the plant had numerous problems like high Settled Volume Index (SVI) and low sludge thickening. The author found that Pickle liquor (ferrous chloride) had been constantly added to the primary influents to the extent of 10 ppm, with an idea of reducing the phosphate levels in the final effluent. According to this author, not only the chemical concept is wrong but also such a high dose is toxic to microbes (2), thereby killing the microbes and resulting into high amount of 'chemical sludge'. The operators and the management thought that this way they are cleaning the water faster. The influent to DWWTP had shown negative ORP (avg. −180 mV) for a significant number of days in that period. Pickel liquor (3 ppm) lowers the ORP by 80 mV. The addition of ferrous salts under such conditions would be of little value because a significant proportion of iron will continue to exist as ferrous and results in carryover of soluble ferrous phosphate to the secondary system. Even if the ferrous chloride is added after the sewage attained an ORP of +120 mV, the final ORP would be around +40 mV, where only negligible portion of it would be converted to ferric to form insoluble ferric phosphate. Therefore, when pickel liquor is added, more time and work is needed to bring the water back to the desired +120 mV ORP range. Additionally, since ferrous ions are ready to release the extra electron on them, it adds to the electron pressure (i.e. lesser ORP and higher chemical oxygen demand). It takes us away from proper conditions for floc formation, as there is more dispersal due to additional excessive charge. This was the cause of high SVIs and low sludge thickening.

On the other hand, 3 ppm of ferric chloride raises the ORP by 30 mV. If ferric chloride is added after the waters have attained nearly +90 mV (possible mostly in the aeration basins), the resultant ORP would be near +120 mV, where almost 50% of the iron added to the sewage will remain as Ferric and insoluble ferric phosphate is formed. As water moves ahead, the ORP rises itself, more and more ferric is formed and the phosphate is complexed and gets settled in secondary clarifiers. In this approach, lesser oxygenation (upto +90 mV only) and significantly less iron salts are needed, without violating any permit or causing any side effects.

The laboratory data indicates that aeration first followed by ORP based ferric chloride addition results in more phosphate removal with significantly lower dose of iron salt needed. One plant has shown significant cost savings with better phosphorus removal by shifting the point of addition of ferric chloride from primary treatment to a location in aeration basin of the activated sludge (without any knowledge or mention of ORP (1).

Iron salts, as being added currently to the primary influents with a wrong notion of removing phosphate, have historically lead to a number of problems at DWWTP like high Settled Volume Index (SVI)s and low sludge thickening. There appears to be clear and manageable relationship between mixed liquor suspended solids, oxidation reduction potential of influents, type of iron salt and point of its addition. If managed properly, NPDES permissible limits of phosphate levels in effluent can be met at least cost. This patent is the first attempt to highlight the importance of ORP in general and its use in making the processing decisions based on the continuous monitoring of the Oxidation-Reduction Potential (ORP) status of wastewater as this is the proper and economic way of managing this business.

Tests indicate that if three waters having different ORPs are mixed in equal ratio, the final ORP is that of the water with higher value. That means if the wastewater influent streams in any plant are mixed and then merged with a water of Higher ORP, the resultant ORP would be of that of the water added later. This would precondition the wastewater sufficiently for processing at significant savings of resources, time and money.

3 ppm of Pickel liquor (ferrous chloride) lowers the ORP by about −80 mV, taking us away from the target. Its use at negative ORP values is simply illogical in primary sedimentation as it increases the amount of work needed to bring the wastewater to the previous state.

Ferric chloride (3 ppm) raises ORP by about +30 mV.

Aeration (10 psi, 45 min) raises ORP by about +200 mV. Aeration alone, in other words, helps us reach the target value of +120 mV. If this is followed by a calculated amount of ferric chloride, phosphate removal can be effective and economical.

When Fecl3 is added after aeration, there is at least 26% more reduction in soluble phosphate and 26% additional reduction in turbidity.

When Pickel liquor is added before or after aeration, there is relatively lesser reduction in soluble phosphate and practically no reduction in turbidity, because the gains in ORP due to aeration are negated by ferrous chloride.

Based on the current information, the aeration of sewage to at least +90 mV followed by addition of ferric chloride and polymer, will reduce iron requirement and will afford better effluent with lesser phosphate. However, on many days, depending on the type of influent, it may not be possible to reach +90 mV. Practically, to maximize the effective use of resources, an ORP of at least +50 mV must be achieved before adding any chemical.

According to this observations, some design changes can be proposed. For example, there should be at least three ports in each aeration basin where FeCl3 can be released. The nearest FeCl3 port where ORP has reached at least +50 mV, be opened and the dosage just sufficient to neutralize the soluble phosphates in excess of NPDES allowable limits, be added. The resulting insoluble ferric phosphate will settle later in secondary clarifiers. This way not only an optimum amount of chemicals are used, but also regulatory requirements are met without contaminating the final product.

EXAMPLE 1

Removal of Phosphate to meet NPDES Limit of 1 ppm.

Ferric and ferrous ions exist in equal ratio at 120 mV (i.e. $pK_{ORP}$ of iron salts is 120 mV). Suppose the ORP of influent and wastewater in the plant is −200 mV. Aeration is proposed to be done to raise the ORP close to 120 mV. At this point the computer software will also analyze phosphate concentration in water. Suppose it is 1.5 ppm. The computer software will sense the amount of water and will arrange for release of the calculated amount of ferric chloride just sufficient to precipitate the excess 0.5 ppm of phosphate. This way the plant effluent will maintain 1.0 ppm phosphate to meet the regulatory requirements of NPDES permit.

EXAMPLE 2

Proper Dewatering of Sludge

A floe is formed at or near zero ORP which then tends to settle faster. If the ORP is negative, floe is not formed and remains suspended. The plants use tremendous energy to dewater this material.

It is proposed to aerate the influent as well as add positively charged polymer so as to bring the ORP of wastewater near zero. This solution is then allowed to enter in centrifuges or belt-filter presses where water is effectively separated from sludge with less effort. The computer software will sense the flow rate of wastewater and the current value of ORP, and will arrange for release of a controlled amount of polymer until near-zero ORP is achieved.

It will therefore be understood that the computer software program will interact and maintain the interplay between ORP measuring probe, water flow measuring probe, phosphate measuring probe, ferric chloride releasing or dosing mechanism and polymer releasing or dosing mechanism, and will be housed in a suitable equipment body, which in turn is electronically linked to a central control room.

There are several ways to increase the ORP value or neutralize the charge of water, few of them being:

i) aeration,
ii) acidification,
iii) induction of conditions to cause ion exchange with microorganisms, where microorganisms absorb electrons or negatively charged molecules and release positively charged molecules,
iv) addition of adsorbants of electron or negatively charged molecules and the like.

The terms oxidation reduction potential and zeta potential have overlapping meanings depending upon the situation. For wastewater when one raises the ORP, one is also simultaneously changing the zeta potential. Since the flocs start forming near zero zeta potential, the expression of optimizing or raising ORP may also be considered as optimizing or raising the zeta potential of wastewater.

Supporting Data

Now I present the laboratory data to support my claims to this patent:

Table I shows that the ORP of the plant influents samples collected for March 30–April 26 were positive for 40% of the time during the cold months. During the warmer months of June and July the plant influents ORP is always negative. Of note is the increase in ORP values of the sewage as the sewage flows thorough the treatment process.

These seasonal changes must be factored-in while considering aeration as well as chemical addition, because during cold as well as after wet weather lesser aeration and less chemical treatment would be needed. On the other hand, more emphasis should be put on aeration of influent sewage during sunny and hot weather to adjust ORP to a suitable level.

TABLE 1

PLANT DATA AND ORP VALUES AT VARIOUS POINTS AT DWWTP

| Date | Ambient Air Temp. F. | Weather | Precipitation (inches) | Feed = Fe++/ Fe+++ | Feed rate pickel liqor (ppm) | Primary influent sol. P (ppm) | Secondary effluent sol. P (ppm) | P removal % | Total Plant inflow (mgd) |
|---|---|---|---|---|---|---|---|---|---|
| Mar. 30, 2000 | 41 | Part cloudy | 0 | Fe++ | 2.9 | 1.2 | 0.28 | 76.7 | 525 |
| Apr. 10, 2000 | 35 | Cloudy | 0 | Fe++ | 2.8 | 1.0 | 0.15 | 85.0 | 615 |
| Apr. 13, 2000 | 44 | Sunny | 0 | Fe++ | 2.9 | 1.0 | 0.20 | 80.0 | 576 |
| Apr. 24, 2000 | 57 | Sunny (4 d after rain) | 0 | Fe++ | 2.8 | 0.3 | 0.05 | 83.3 | 797 |
| Apr. 26, 2000 | 60 | Sunny | 0 | Fe++ | 2.9 | 0.8 | 0.09 | 88.8 | 695 |

TABLE 1-continued

PLANT DATA AND ORP VALUES AT VARIOUS POINTS AT DWWTP

| Jun. 10, 2000 | 64 | Sunny | 0 | Fe++ | 1.9 | 0.8 | 0.22 | 72.5 | 596 |
| Jun. 16, 2000 | 67 | Sunny (3 d after rain) | 0 | Fe++ | 2.0 | 1.0 | 0.27 | 73.0 | 598 |
| Jun. 26, 2000 | 72 | Sunny (1 d after rain) | 0 | Fe++ | 2.2 | 0.2 | 0.05 | 75.0 | 1261 |
| Jun. 29, 2000 | 78 | Part cloudy | 0 | Fe++ | 2.0 | 0.7 | 0.44 | 37.1 | 684 |
| Jul. 06, 2000 | 72 | Part cloudy | 0 | Fe++ | 1.9 | 0.8 | 0.24 | 70.0 | 726 |
| Jul. 07, 2000 | 74 | Clear Sunny | 0 | Fe++ | 2.0 | 0.6 | 0.20 | 66.7 | 680 |
| Jul. 11, 2000 | 67 | Clear Sunny | 0 | Fe++ | 1.9 | 0.8 | 0.20 | 75.0 | 663 |
| Jul. 13, 2000 | 76 | Part cloudy | 0 | Fe++ | 2.0 | 1.0 | 0.20 | 80.0 | 573 |

| | | | ORP Values | | | | |
|---|---|---|---|---|---|---|---|
| | Jeff | Oak | NIEA | PS2A, 500 ft away from mixing point | PEAS 1 | C2E3 | C2E4 | Tap water |
| Mar. 30, 2000 | | | 190 | 205 | 165 | | | |
| Apr. 10, 2000 | | | −116 | 74 | 17 | | | |
| Apr. 13, 2000 | | | −81 | 65 | 22 | 144 | 152 | 452 |
| Apr. 24, 2000 | | | 110 | 119 | 107 | 152 | 149 | 444 |
| Apr. 26, 2000 | | | −112 | 136 | 48 | | | |
| Jun. 10, 2000 | | | −115 | | | | | |
| Jun. 16, 2000 | −158 | −155 | −152 | | | | | |
| Jun. 26, 2000 | −48 | −22 | −113 | | | | | |
| Jun. 29, 2000 | −118 | −116 | −123 | | 10 | | | |
| Jul. 06, 2000 | −173 | −105 | −170 | | −12 | | | |
| Jul. 07, 2000 | −63 | −191 | −201 | | 21 | 65 | | |
| Jul. 11, 2000 | | −90 | −157 | | 62 | | | |
| Jul. 13, 2000 | −140 | −137 | −174 | 101 | 14 | | | |
| Average ORP -> | −117 | −117 | −93.4 | | | | | |

Negative ORPs are shown in bold.

Table 2 confirms that aeration alone raises the ORP of influent sewage by about 195+/−29 units, depending upon quality of the influent each day.

TABLE 2

Effect of Aeration on ORP

| Date of Experiment | Initial ORP (mV) | Aeration time 10 psi | Final ORP (mV) | Change in ORP (mV) |
|---|---|---|---|---|
| Sep. 03, 2000 | −185.4 | 30 min | 37.7 | 223.1 |
| Sep. 07, 2000 | −187 | 15 min | 15.0 | 202 |
| Oct. 31, 2000 | −186.3 | 30 min | 22.7 | 209 |
| Nov. 02, 2000 | −164.5 | 45 min | 19.5 | 184 |
| Nov. 09, 2000 | −192.1 | 45 min | 45.2 | 237.3 |
| Jan. 15, 2002 | −7.2 | 15 min | 133.5 | 140.7 |
| Jan. 18, 2002 | −122.6 | 15 min | 75.9 | 198.5 |
| Jan. 24, 2002 | −136.1 | 15 min | 33.3 | 169.4 |
| Feb. 08, 2002 | −110.1 | 15 min | 77.0 | 187.1 |
| Average change in ORP | | | | 194.6 |
| Standard Deviation ~~~~~~~> | | | | 28.8 |

Table 3 indicates that:
a) When waters with different ORP values are combined in equal ratio, the final ORP is equal to that of having highest value. This fact is of high commercial value.
b) Just as protons are added through acidification, the electron concentration is reduced and ORP rises. This proves that it is mainly the electron concentration that is indicative of ORP status of water. The rise in pH due to aeration is unique and has not been described in literature and as such cannot be explained at this time.
c) The pH of influents was around 7.4 and the ORP is negative. As per our experience, nothing should happen if iron and polymers are added at this stage. It appeared that attainment of an optimum ORP is essential to wastewater processing as the turbidity (NTU) got lowered only when ferric chloride and polymer were added near +122 mV. This confirms that decisions based solely on pH may not yield the desired results.

TABLE 3

THE EFFECT OF COMBINING SAMPLES, AERATION & POLYMER ADDITION ON pH AND ORP

| | ORP | pH | NTU |
|---|---|---|---|
| OAKWOOD INFLUENT | −157.5 | 7.45 | NA |
| JEFFERSON INFLUENT | −186.1 | 7.20 | NA |
| OAKWOOD + JEFF 1:1 | −158.0 | 7.44 | NA |
| NIEA INFLUENT | −192.1 | 7.34 | NA |
| ORP AFTER COMBINING OAKWOOD, JEFFERSON, & NIEA 1:1:1 | −155.2 | 7.44 | 49.0 |
| AFTER AERATION 45 MINUTES, 10 psi | 45.2 | 8.63 | 45.9 |
| AFTER POLYMER 250 ul | 45.2 | 8.63 | NA |
| AFTER POLYMER, additional 250 ul | 45.0 | 8.63 | 43.5 |
| 10% HCl to pH 7.00 (1100 ul was needed) | 122.7 | 7.00 | 44.0 |
| Fe+++ 50 ul | 118.3 | NA | 50.0 |
| PS2A polymer, additional 250 ul | 105.7 | NA | 18.3 |

Table 4 indicates that limited aeration is better than excessive turbulence. Too much aeration might worsen the quality of effluent. Also it shows that excessive ferric chloride is of no additional use.

TABLE 4

EXPERIMENT TO SEE HOW MUCH AERATION IS REQUIRED
Dated Sept. 01, 2000

These three were additionally blended at high speed for 1 min

|  | Beaker 1<br>Raw sample<br>Undisturbed | Beaker 2<br>Aerated 30 min 10 psi<br>FeCl3 100 µl<br>PS2A Polymer 250 µl | Beaker 3<br>Aerated 30 min 10 psi<br>FeCl3 150 µl<br>PS2A Polymer 250 µl | Beaker 4<br>Aerated 30 min 10 psi<br>none<br>none | Beaker 5<br>Aerated 30 min 10 psi<br>FeCl3 100 µl<br>PS2A Polymer 250 µl | Beaker 6<br>Aerated 30 min 10 psi<br>FeCl3 150 µl<br>PS2A Polymer 250 µl |
| --- | --- | --- | --- | --- | --- | --- |
| ORP (mV) | −156.5 | −43.1 | −47 | 23 | 67.3 | 36.2 |
| Turbidity | 81.5 | 6.7 | 6.5 | 109* | 18.7* | 41.4* |

*The turbidity is high after blending probably due to microbubbling during high turbulence of the blender. An impractical situation.

Tables 4 and 5 show that there is significant rise in ORP by aeration alone. In this sample, only the ferric chloride and polymer addition was enough to get an effluent with a low turbidity (Beaker 1.2 & 3). This is, however, not always true, as effluents on some days will not yield at all (see Table 6). This experiment also indicates that, aerate or not, the excessive amount of ferric has a non-significant effect on ORP or turbidity.

TABLE 5

EXPERIMENT TO SEE IF AERATION FIRST IS REALLY BENEFICIAL
Sept. 07, 2000

|  | Beaker 1<br>Raw sample | Beaker 2<br>Raw sample<br>FeCl3 50 µl<br>PS2A Polymer 250 µl | Beaker 3<br>Raw sample<br>FeCl3 100 µl<br>PS2A Polymer 250 µl | Beaker 4<br>Aerated 15 min<br>none<br>none | Beaker 5<br>Aerated 15 min<br>FeCl3 50 µl<br>PS2A Polymer 250 µl | Beaker 6<br>Aerated 15 min<br>FeCl3 100 µl<br>PS2A Polymer 250 µl |
| --- | --- | --- | --- | --- | --- | --- |
| ORP | −187 | −131 | −110 | 15 | 32 | 42 |
| Turbidity | 95 | 24.5 | 13.7 | 85 | 23.5 | 11.4 |

Phosphates were not studied.

Tables 2, 4, 5, 6, 7, 8 & 9 establish that the aeration alone raises the ORP sufficiently enough to prepare conditions for ferric chloride to work.

TABLE 6

THE EFFECT OF AERATION FIRST ON PHOSPHATES
Jan. 15, 2002

|  | Beaker 1<br>Raw sample<br>Undisturbed<br>none | Beaker 2<br>Raw sample<br>Undisturbed<br>FeCl3 50 µl | Beaker 3<br>Raw sample<br>Undisturbed<br>FeCl3 100 µl | Beaker 4<br>Aerated 15 min<br>none | Beaker 5<br>Aerated 15 min<br>FeCl3 50 µl | Beaker 6<br>Aerated 15 min<br>FeCl3 100 µl |
| --- | --- | --- | --- | --- | --- | --- |
| Chemical addition | Wait 5 min | Wait 5 min | Wait 5 min | Wait 5 min | Wait 5 min | Wait 5 min |
| ORP (mV) | −7.2 | 26.5 | ND* | ND | 133.5 | ND |
| Turbidity | 96.5 | 95.2 | ND | ND | 93.5 | ND |
| Total P | 0.12 | 0.06 | ND | ND | 0.04 | ND |

The starting ORP was already high as expected because the sample was not brought air tight.
ND* = Not determined, because the sample was highly colloidal and no physical change was observable.

Tables 7 represents a sample where phosphates were lowered just by addition of ferric chloride and that aeration after this has a cumulative effect and phosphates are lowered further. This supports the hypothesis that given a fixed iron dose, more ferric ions are made available as a result of increase in ORP. In the non-aerated samples, ORP is raised just by addition of ferric salts.

TABLE 7

ROLE OF FERIC CHLORIDE, WITH OR WITHOUT AERATION
Jan. 18, 2002

| | Beaker 1<br>none<br>Raw sample<br>Undisturbed<br>Wait 10 min | Beaker 2<br>FeCl3 50 μl<br>Raw sample<br>Undisturbed<br>Wait 10 min | Beaker 3<br>FeCl3 100 μl<br>Raw sample<br>Undisturbed<br>Wait 10 min | Beaker 4<br>FeCl3 50 μl<br>Aerated 15 min<br>Wait 10 min | Beaker 5<br>FeCl3 100 μl<br>Aerated 15 min<br>Wait 10 min |
|---|---|---|---|---|---|
| Chemical addition | | | | | |
| Action | | | | | |
| ORP = −122.6 mV | | | | | |
| ORP | −117.3 | −82 | 38.5 | 75.9 | 91.8 |
| Sol. P (Avg. of 2) | 0.11 | 0.09 | 0.06 | 0.045 | 0.035 |
| Calculated sol P (x51) | 5.61 | 4.59 | 3.06 | 2.295 | 1.785 |
| Turbidity (NTU) | 51.5 | 47.1* | 19.2* | 13.3 | 7.2 |

*floc like ppts were settling 5 min after addition of FeCl3
Contractor supplied FeCl3 solution was used (PVS Tech PJST #28358-4 dtd 1-/31/00 stored at RT)

Tables 8 confirms that if ferric chloride is added after aeration:

a) Lesser amount of FeCl3 is needed to remove phosphate and that the excessive use is unnecessary.

b) ORP is additionally increased by 26%, soluble P as well as turbidity is reduced by additional 26%.

c) Adding FeCl3 before aeration removes 35.2% phosphate, whereas 59% is removed when FeCl3 is added after aeration.

TABLE 8

EFFECT OF REVERSING THE SEQUENCE OF IRON ADDITION AND AERATION
Feb. 19, 2002

| | | IN DUPLICATE | | IN DUPLICATE | | |
|---|---|---|---|---|---|---|
| | Beaker 1<br>BLANK<br>None<br>stirred slowly 30 min<br>290 μl<br>Wait 1 hr | Beaker 2<br>IRON FIRST<br>FeCl3 30μl<br>AIR 10 psi 30 min<br>290 μl<br>Wait 1 hr | Beaker 3<br>IRON FIRST<br>FeCl3 30μl<br>AIR 10 psi 30 min<br>290 μl<br>Wait 1 hr | Beaker 4<br>AERATION FIRST<br>AIR 10 psi 30 min<br>FeCl3 30μl<br>290 μl<br>Wait 1 hr | Beaker 5<br>AERATION FIRST<br>AIR 10 psi 30 min<br>FeCl3 30μl<br>290 μl<br>Wait 1 hr | Change |
| Initial ORP = −119.6 mV | | | | | | |
| PS2A POLYMER | | | | | | |
| ORP after 1 hr | −45.3 | 101.8 | 111.5 | 134.6 | 134.2 | 26% |
| Sol. P (Avg. of 2) | 0.825 | 0.54 | 0.53 | 0.41 | 0.38 | |
| Calculated sal P (x7) | 5.775 | 3.78 | 3.71 | 2.87 | 2.66 | −26% |
| Turbidity after 1 hr | 51.1 | 30.7 | 35.1 | 22.6 | 26.4 | −26% |

Aeration was done through four new ceramic filter cartridges, so that the other two beakers do not have to wait for 30 min.
All the beakers got similar treatments wrt to air.
Contractor supplied (FRESH) FeCl3 solution was used (PVS TECH #39433-1 of Feb. 04,2002)
Exactly 1 ml sample was filtered through .45 μm syringe filters and all was added to tube for sol P determination.

Table 9. This table represents the effect of adding pickel liquor before and after aeration. Normally, pickel liquor has often been seen to lower the ORP by approximately 80 units but in this sample it didn't. However, the relative gain in ORP by aeration was lesser than that with FeCl3 in table 8 above. The phosphorus got removed possibly due to small portion of ferric formed at specified ORP, but it does not reduce the overall turbidity of the resulting solution. Even aeration didn't have any effect. Again, excessive use of pickel liquor had no additional benefit.

TABLE 9

ROLE OF PICKEL LIQUOR, WITH OR WITHOUT AERATION
Jan. 24, 2002

| Chemical addition<br>Action<br>Initial ORP = −136.1 | Beaker 1<br>Raw sample<br>None<br>Undisturbed<br>Wait 10 min | Beaker 2<br>Pickel Liqor 50 µl<br>Undisturbed<br>Wait 10 min | Beaker 3<br>Pickel Liqor 100 µl<br>Undisturbed<br>Wait 10 min | Beaker 4<br>Pickel Liqor 50 µl<br>Aerated 15 min<br>Wait 10 min | Beaker 5<br>Pickel Liqor 100 µl<br>Aerated 15 min<br>Wait 10 min |
|---|---|---|---|---|---|
| ORP | −121.2 | −127.6 | −130.5 | 3.3 | −37.5 |
| Sol. P (Avg. of 2) | 0.14 | 0.12 | 0.07 | 0.075 | 0.07 |
| Calculated Sol P (x14) | 1.96 | 1.68 | 0.98 | 1.05 | 0.98 |
| Turbidity | 87.1 | 86.3 | 92.6 | 86.1 | 88.5 |

Contractor supplied Pickel liqor solution was used (PVS Tech T/T 109 24A DTD
Exactly 1 ml sample was filtered through .45 µm syringe filters and 500 µl of filterate was taken for sol P determination.

I claim:

1. A method of treating wastewater, comprising the steps of:
    a) monitoring an oxidation-reduction potential (ORP) of a wastewater stream over time at a plurality of processing stages using a plurality of ORP sensors, said plurality of processing stages comprising a first stage before the wastewater enters a water treatment facility and a second stage inside of the water treatment facility;
    b) optionally, aerating said wastewater to raise the ORP thereof if the sensed ORP at the any stage is below a target ORP range; and
    c) modifying the wastewater, as needed, based on the sensed ORP thereof, so as to raise the effective ORP thereof when the sensed ORP at any stage is below a target ORP range.

2. The method of claim 1, wherein the modifying step comprises:
    adding an effective amount of one or more chemical additives to the wastewater to raise the ORP thereof when the ORP is below a target ORP range.

3. The method of claim 1, wherein the aeration step is accomplished by aerating the wastewater in specially designed influent channels or sewage pipes via mechanisms provided therein to cause turbulence in water so that the influent waters interact with oxygen from the air forced into these channels.

4. The method of claim 1, wherein the aeration step is accomplished by providing an open-air route to influent streams before entering the water treatment facility, so as to allow water-air contact for an extended period of time.

5. The method of claim 1, wherein the aeration step is accomplished by providing extensive aeration of water inside the plant until the desired ORP level is achieved.

6. The method of claim 1, wherein the modifying step comprises mixing the wastewater with a relatively high ORP water from a separate source, such as water from a spring, fountain, melting or melted snow, a river or a part of the processed water from the water treatment facility.

7. The method of claim 1, wherein the modifying step comprises adding positively charged ions from an acidic chemical.

8. The method of claim 1, wherein the modifying step comprises adding a chemical which removes electrons from solution, consumes electrons or transfers electrons to other molecules so that the effective ORP of the wastewater effluents is raised or achieved.

9. The method of claim 1, wherein the modifying step comprises providing conditions where negative ions or electrons are absorbed or transported inside of microorganisms present in the wastewater and equivalent or more amount of positively charged molecules get excreted by said microorganisms.

10. The method of claim 1, wherein the monitoring, aerating and modifying steps are each controlled by a computer according to a software program.

11. A method of treating wastewater, comprising the steps of:
    a) monitoring an oxidation-reduction potential (ORP) of a wastewater stream over time at a plurality of processing stages using a plurality of ORP sensors, said plurality of processing stages comprising a first stage before the wastewater enter a water treatment facility and a second stage inside of the water treatment facility;
    b) optionally, aerating said wastewater to raise the ORP thereof if the sensed ORP at the any stage is below a target ORP range; and
    c) modifying the effluents, as needed, based on the sensed ORP of the wastewater by adding at least one additive selected from a group consisting of ferric chloride and polymer.

12. The method of claim 11, wherein the aeration step is accomplished by aerating the wastewater in specially designed influent channels or sewage pipes via mechanisms provided therein to cause turbulence in water so that the influent waters interact with oxygen from the air forced into these channels.

13. The method of claim 11, wherein the aeration step is accomplished by providing extensive aeration of water inside the plant until the desired ORP level is achieved.

14. The method of claim 11, wherein the adding of said additive is done at a sensed ORP of the wastewater which is at or near a predetermined equilibrium constant, $pK_{ORP}$, of the selected chemical additive.

15. The method of claim 11, further comprising steps of
    d) analyzing a sample of the wastewater to test for presence and quantity of an unwanted contaminant which may be present therein;
    e) modifying the wastewater to attain an ORP value compatible with a predetermined equilibrium constant, $pK_{ORP}$, of said chemical additive; and
    f) adding a dose of a compound targeted to remove or neutralize said contaminant.

16. The method of claim 11, wherein the monitoring, aerating and modifying steps are each controlled by a computer according to a software program.

17. A method of treating wastewater according to claim 1, wherein the modifying step comprises substeps of:

c1) analyzing a phosphate content of said wastewater;
c2) measuring flow rate of said wastewater;
c3) calculating an amount of ferric chloride required to precipitate phosphate in excess of regulatory limits;
c4) adding ferric chloride in the amount calculated in the method step (c5);
c5) calculating an amount of cationic polymer needed to raise the ORP of a sludge fraction of the wastewater to an acceptable value; and
c6) adding a cationic polymer in the amount calculated in method step (c5).

18. A method of treating wastewater according to claim 1, wherein the aerating step comprises aerating the wastewater to an ORP value in a range of 80–120, and further comprises steps of checking phosphate level in the wastewater and precipitating excess phosphate by adding ferric chloride to the wastewater.

19. A method of treating wastewater according to claim 11, wherein the modifying step comprises substeps of:
c1) analyzing a phosphate content of said wastewater;
c2) measuring flow rate of said wastewater;
c3) calculating an amount of ferric chloride required to precipitate phosphate in excess of regulatory limits;
c4) adding ferric chloride in the amount calculated in the method step (c5);
c5) calculating an amount of cationic polymer needed to raise the ORP of a sludge fraction of the wastewater to an acceptable value; and
c6) adding a cationic polymer in the amount calculated in method step (c5).

* * * * *